United States Patent [19]

Wilson

[11] Patent Number: 5,687,627
[45] Date of Patent: Nov. 18, 1997

[54] RAIL CUTTING DEVICE

[76] Inventor: Timothy R. Wilson, 13-36th Ave Cir. S., Moorhead, Minn. 56560

[21] Appl. No.: 531,936

[22] Filed: Sep. 21, 1995

[51] Int. Cl.$^6$ ........................................ B24B 27/08
[52] U.S. Cl. .................. 83/745; 83/490; 30/372; 30/388; 451/347
[58] Field of Search ................ 30/372, 371, 388; 451/347, 429; 83/490, 745

[56] References Cited

U.S. PATENT DOCUMENTS

| | | | |
|---|---|---|---|
| 1,988,138 | 1/1935 | Peck | 451/347 |
| 3,974,596 | 8/1976 | Huboud-Peron | 451/347 |
| 4,033,074 | 7/1977 | Lutts | 451/347 |
| 4,156,991 | 6/1979 | McIllrath | 451/347 |
| 4,765,098 | 8/1988 | Duff et al. | 451/347 |
| 4,873,902 | 10/1989 | Krieg | 83/745 |
| 5,486,136 | 1/1996 | Noda | 451/347 |

*Primary Examiner*—Hwei-Siu Payer
*Attorney, Agent, or Firm*—David A. Lingbeck

[57] ABSTRACT

The rail cutting device includes a base having a pair of jaws fastened together about the head of a rail with a fastening member and an elongate member extending upward from the rail and further comprises a pivot linkage which has one end pivotally attached to the top end of the support member and other end pivotally attached to an elongate support column having a pair of handle members at the top end of the column and a cutting member at the bottom end of the column, the cutting member being actuatable by a hydraulic motor and the support column being of a sufficient length such that the handle members are essentially at or above the waist of a user standing essentially erect and operating the cutting device.

8 Claims, 3 Drawing Sheets

RAIL CUTTING DEVICE

BACKGROUND OF THE INVENTION

The present invention relates to a rail cutting device for cutting through railroad rails, in particular, while the user is standing rather than kneeling or bending over as is commonly done with the prior art.

Saws having circular blades are typically used to cut through railroad rails. The prior art decribes hand-held circular saws pivotally attached to linkage members which are attached to rail clamp means where the user must either bend over or kneel near the rail in order to operate the circular saw to cut through the rail. Users operating such saws typically end up with some sort of back problems since in order to do the job, the user is bent over.

One known prior art is a RAIL CUTTING APPARATUS, U.S. Pat. No. 4,156,991, issued on Jun. 5, 1979 and invented by William P. Meilrath, which comprises a linkage structure having an offset arm, a cutting member, and a mounting bar.

Another known prior art is a RAIL CUTTING APPARATUS, U.S. Pat. No. 4,068,415, issued on Jan. 17, 1978 and invented by William P. Meilrath, which comprises a base having fingers for clamping to the head of a rail, a clamp for clamping the fingers about the head of the rail, and a pair of links having adjacent ends pivotally interconnected, one of the links having an opposite end pivotally connected to the cutting tool, and the other link having an opposite end pivotally connected to the base.

Another known prior art is a RAIL-CUTTING MACHINE, U.S. Pat. No. 3,630,506, invented by Franz Plasser, which comprises a blowtorch, a holder for the blowtorch, two guide rods, a control means for pivoting the guide rods so that the blowtorch moves through a cutting path, a stop means for limiting the pivoting movement of the guide rods and thus to limit the cutting path of the blowtorch, and a means to control the velocity of the pivoting movement.

There is a definite need for a rail cutting device which allows the user to stand rather than to bend over while operating the device and which substantially reduces the strain put on the backs of the users.

SUMMARY OF THE INVENTION

This invention relates to a rail cutting device which comprises a base having a clamping means which clamps to the head of a rail and having an elongate support member fixedly attached to the clamping means and extending upward at a slight angle relative to the top of the clamping means, and comprises a pivot linkage having a first tubular housing at one end of the pivot linkage and a second tubular housing at the other end of the pivot linkage and further having a first pivot means pivotally connecting the pivot linkage to the top end portion of the support post and having a second pivot means pivotally connecting the pivot linkage to a cutting means comprising a support column, a cutting member which is rotatably mounted to a bottom portion of the support column, and handle means attached to the top portion of the support column. The cutting member is preferably a circular blade which is actuatable by a conventional hydraulic motor. A user of this rail cutting device can stand up without having to stoop or bend to operate this device.

One objective of the present invention is to provide a rail cutting device which eliminates the user from having to bend or stoop in order to cut the rail as is the case with prior art.

Another objective of the present invention is to provide a rail cutting device which allows the user to stand virtually erect while operating this device during the cutting of the rail.

Also, another objective of the present invention is to provide a rail cutting device which substantially reduces the risk of injury to the user since the user is removed farther from the cutting operation than the users in any of the prior art.

Yet, another objective of the present invention is to provide a rail cutting device which substantially reduces back strain or back problems for the user.

Further objectives and advantages of the present invention will become apparent as the description proceeds and when taken in conjunction with the accompanying drawings wherein:

DETAILED DESCRIPTION OF THE INVENTION

Figure 1:
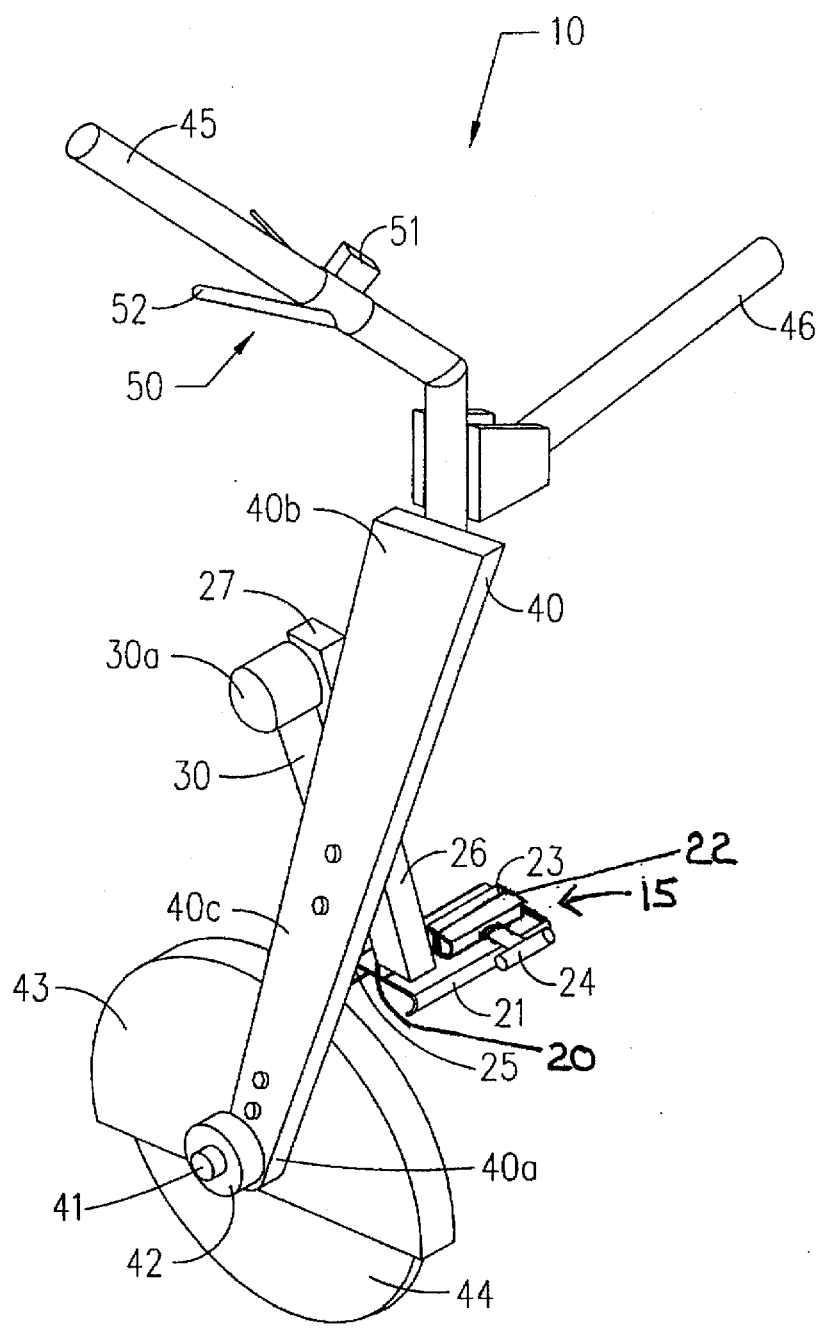
FIG. 1 is a perspective view of the rail cutting device attached to a rail.
Figure 2:
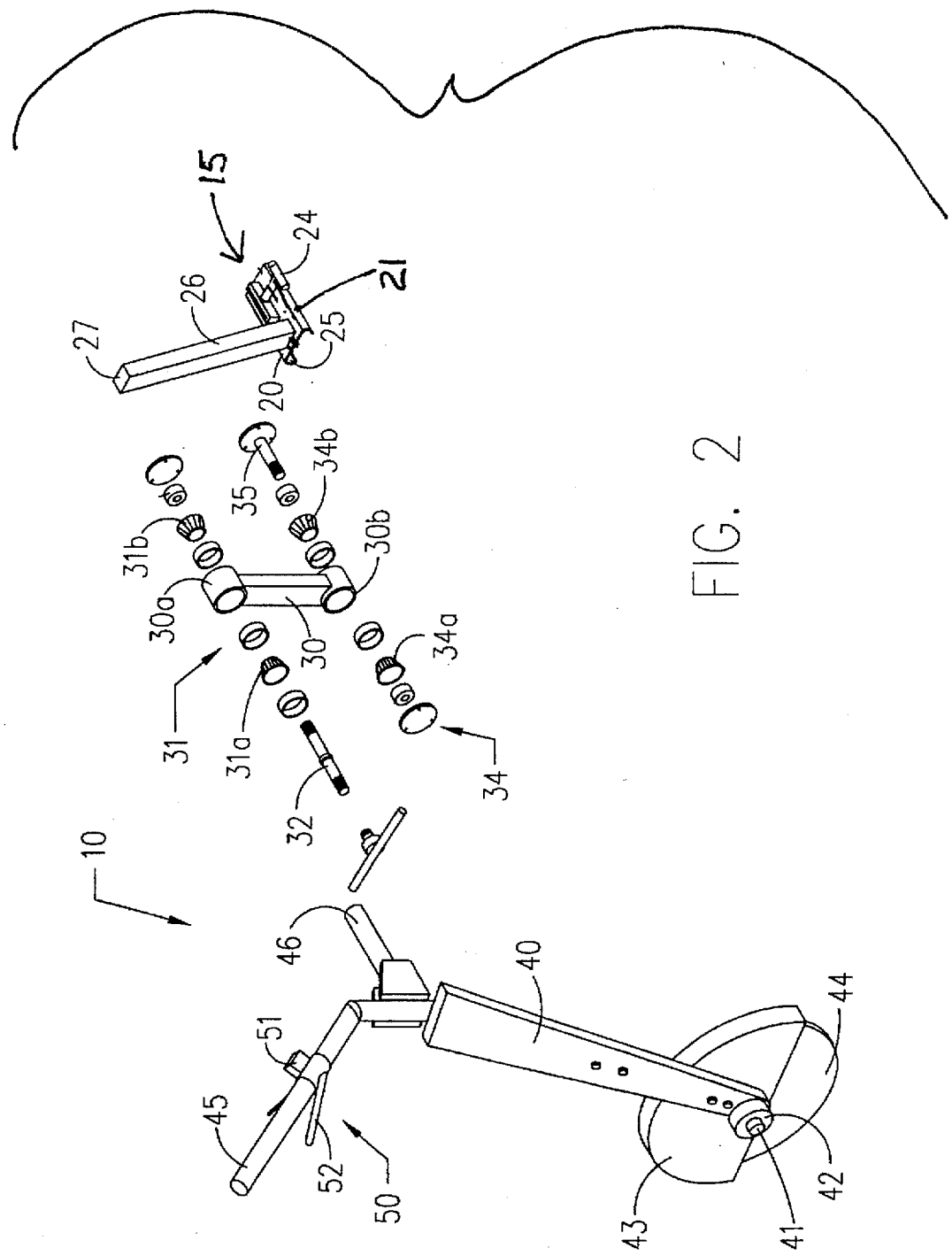
FIG. 2 is an exploded perspective view of the base and pivot linkage of the rail cutting device.
Figure 3:
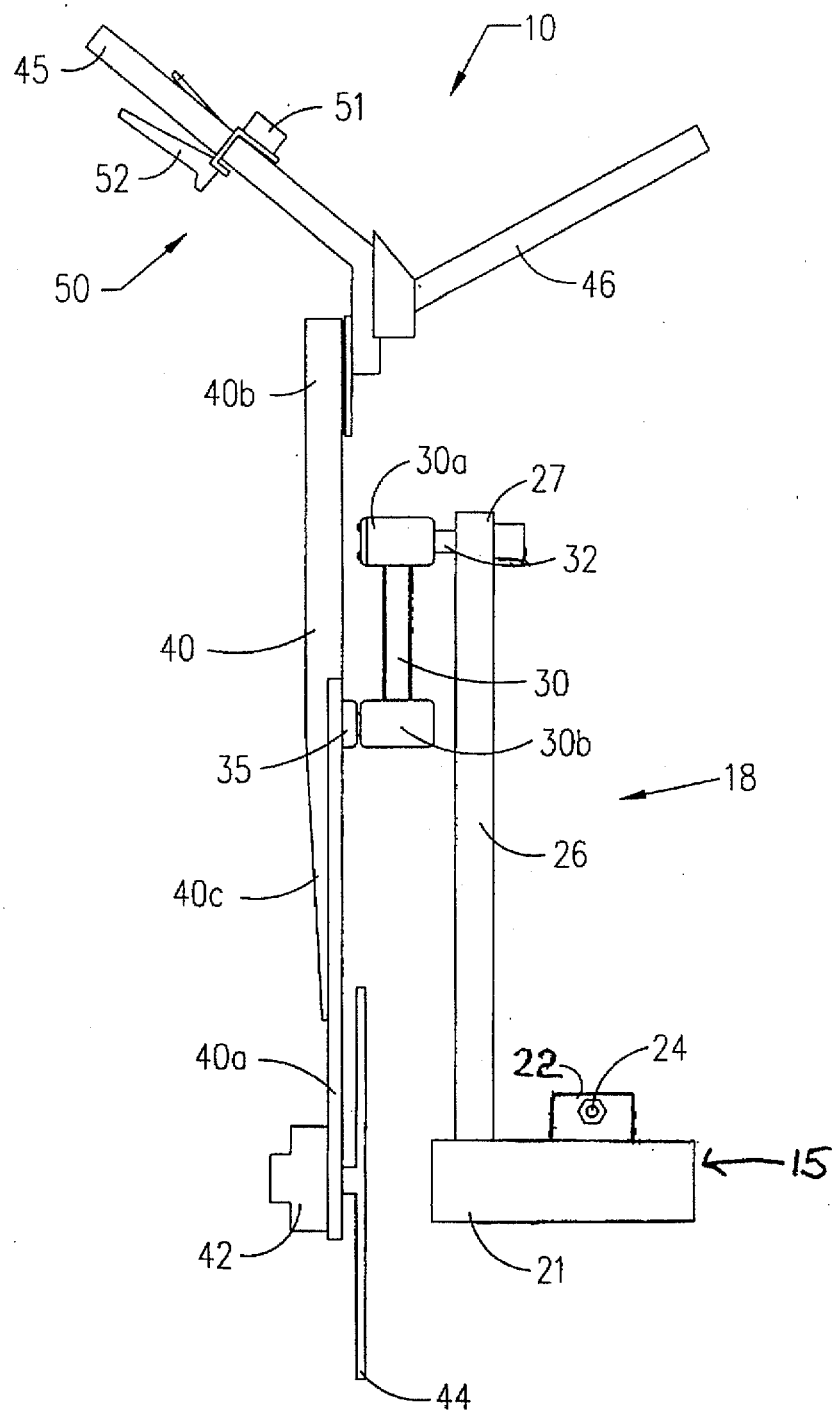
FIG. 3 is a front elevational view of the rail cutting device.

Referring to the drawings in FIGS. 1–3, in particular, the rail cutting device 10 comprises a base 15 having a clamping means 18 which includes a pair of opposed jaws 20 & 21 at least one of which has a serrated edge 25 along the length thereof for gripping the underside of the head of a rail, a pair of brackets 22 & 23 each being fixedly attached to a top of a respective jaw 20 & 21, a fastening member 24 threaded through the two brackets 22 & 23 for conventionally clamping the jaws 20 & 21 about the head of the rail, and an elongate support member 26 fixedly attached to the top of at least one jaw and extending upward at a slight angle relative to the tops of both jaws 20 & 21.

As shown in FIG. 2, the rail cutting device 10 also comprises a pivot linkage 30 having a first tubular housing 30a integral to one end of the pivot linkage 30 and having a second tubular housing 30b integral to the other end of the pivot linkage 30. The pivot linkage 30 further comprises a first pivot means 31 pivotally connecting the pivot linkage 30 to the top end portion 27 of the support member 26, the pivot linkage 30 essentially being pivotally biased upon a first axis which is generally parallel to the length of the rail. The first pivot means 31 comprises a shaft 32 having a first end portion journaled in a pair of bearings 31a & 31b securely engaged inside the first tubular housing 30a and a second end portion fixedly attached to the top end 27 of the support member 26. A coil spring has one end fixedly attached to the shaft 32 of the first pivot means 31 and the other end fixedly attached to the first tubular housing 30a inside thereof to restrict and bias the pivotal movement of the pivot linkage 30 such that the pivot linkage 30 depends downward from the first pivot means 31 and functions much like a pendulum.

As shown in FIG. 2, the pivot linkage 30 also comprises a second pivot means 34 which pivotally connects the pivot linkage 30 to one of the sides of the support column 40, the second end of the pivot linkage 30 essentially being pivotable about a second axis which is generally parallel to the length of the rail. The second pivot means 34 comprises a shaft 35 having a first end portion journaled to a pair of bearings 34a & 34b securely engaged inside the second tubular housing 30b and having a second end portion fixedly attached to one of the sides of the support column 40 which is pivotal about the second axis relative to the pivot linkage 30 and which is disposed generally parallel to the support member 26 and which is suspended from the second end of the pivot linkage 30. The support column 40 has an upper 40b, lower 40a, and middle 40c portions. The shaft 35 of the second pivot means 34 is fixedly attached to the middle portion 40c of the support column 40 slightly above halfway between the bottom and top ends of the support column 40 so that the support column 40 is balanced and remains essentially upright. A rotatable shaft 41 is journaled through the lower portion 40a of the support column 40 near the bottom end thereof. The cutting member 44 preferably being a circular blade is fixedly mounted upon the rotatable shaft 41 for rotation therewith and is shrouded by a guard 43 to protect the user of the rail cutting device 10 from flying splinters of metal coming from the rail being cut. The rotatable shaft 41 and circular blade 44 is actuated by a drive means which is preferably a conventional hydraulic motor 42 attached to the rotatable shaft 41 with hydraulic hoses (not shown) connected to the hydraulic motor 42 and extending along the support column 40 and connected to a power regulator means 50 which is attached to the upper portion 40b of the support column 40 near the top end thereof with hose fittings (not shown) for connecting to a power source or reservoir containing hydraulic fluid which is used to energize the hydraulic motor 42. The power regulator means 50 includes a casing 51 and a trigger 52 mounted to the casing 51 and spaced from one of two handle members 45 & 46 which are fixedly attached to the top end of the support column 40 such that the trigger 52 may be gripped by the user and squeezed toward the handle member 45 to close a valve inside the casing 51 to shut off the supply of hydraulic fluid to the hydraulic motor 42 which stops the hydraulic motor 42 and the cutting member 44.

As shown in FIG. 3, the support column 40 has a length such that, in operation, the handle members 45 & 46 are essentially at or above the waist of the user when he/she is standing essentially erect and operating the cutting device 10. The user doesn't have to stoop or bend over to cut the rail as he/she would do with the prior art. The rail cutting device 10 is adapted to mount to any size of rail with the jaws 20 & 21 of the clamping means 18 being clamped about the head of the rail with the support member 26 extending upward at a slight angle and having a length such that the support column 40 is essentially suspended from the pivot linkage 30 and such that the cutting member 44 mounted upon the bottom portion 40a of the support column 40 extends partially below the rail to be cut and the two handle members 45 & 46 at the top end of the support column 40 are at or above the waist of the user so that the user can be standing essentially erect to operate the rail cutting device 10. To cut the rail, the user grasps the handle members 45 & 46 and allows the hydraulic fluid from a reservoir to energize the hydraulic motor 42 which actuates the cutting member 44. The user moves the cutting member 44 through the rail by steering the support column 40 with the two handle members 45 & 46. The user can conveniently pivot the support column 40 relative to the pivot linkage 30 and pivots the support column 40 about the pivot linkage 30 and the support member 26 so that the cutting member 44 effectively cuts the rail precisely, all of this being accomplished without the user having to strain his/her back.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A rail cutting device comprising:

a base having a clamping means for clamping to a rail and an elongate support member fixedly attached to said clamping means and extending upward therefrom and having a top end portion;

a pivot linkage having a first end and being pivotally connected to said support member and further having a second end; and a cutting means comprising an elongate support column having a top portion, a bottom portion and a middle portion, and further comprising a rotatable shaft disposed at said bottom portion of said support column, a cutting member mounted to said rotatable shaft for rotation therewith, a motor means mounted on the bottom portion of the support column for actuating said rotatable shaft, and a handle means for steering said cutting means, said support column being pivotally connected to said pivot linkage, said handle means being conveniently disposed at the top portion of the support column in order for a user to operate said cutting means while standing up.

2. A rail cutting device as described in claim 1, wherein said pivot linkage further comprises a first tubular housing integral to said first end and a first pivot means upon which said first tubular housing pivots.

3. A rail cutting device as described in claim 2, wherein said first pivot means comprises a shaft, a pair of bearings, and a coil spring, said shaft being journaled to said bearings which are securely engaged inside said first tubular housing, said shaft also attached to said top end portion of said support member, said first end of said pivot linkage being pivotable about an axis which is generally parallel to the length of said rail.

4. A rail cutting device as described in claim 3, wherein said coil spring is attached to said shaft of said first pivot means and to said first tubular housing, to provide pivotal resistance to said pivot linkage and to said support column so that a user has better control of said cutting means.

5. A rail cutting device as described in claim 1, wherein said pivot linkage further has a tubular housing integral to said second end and a pivot means which pivotally connects said pivot linkage to said support column.

6. A rail cutting device as described in claim 5, wherein said pivot means comprises a shaft and a pair of bearings securely engaged inside said tubular housing, said shaft of said pivot means journaled to said pair of bearings inside said tubular housing, said second end of said pivot linkage and said support column being pivotable about an axis generally parallel to the length of said rail.

7. A rail cutting device as described in claim 1, wherein said second end of said pivot linkage is pivotally connected to said middle portion of said support column.

8. A rail cutting device as described in claim 7, wherein said support member is fixedly attached to a top of said clamping means and extends upward therefrom.

* * * * *